United States Patent
Sheedy et al.

(10) Patent No.: US 10,093,585 B2
(45) Date of Patent: Oct. 9, 2018

(54) METHOD FOR COMBINED DESIZING AND INTERFACE COATING OF FIBERS FOR CERAMIC MATRIX COMPOSITES

(71) Applicant: United Technologies Corporation, Hartford, CT (US)

(72) Inventors: Paul Sheedy, Bolton, CT (US); Neal Magdefrau, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 619 days.

(21) Appl. No.: 14/712,192

(22) Filed: May 14, 2015

(65) Prior Publication Data

US 2016/0264475 A1   Sep. 15, 2016

Related U.S. Application Data

(60) Provisional application No. 62/008,543, filed on Jun. 6, 2014.

(51) Int. Cl.
| | | |
|---|---|---|
| C04B 35/628 | (2006.01) | |
| C04B 35/80 | (2006.01) | |
| C04B 35/622 | (2006.01) | |
| C04B 35/76 | (2006.01) | |

(52) U.S. Cl.
CPC .... *C04B 35/62868* (2013.01); *C04B 35/6286* (2013.01); *C04B 35/62277* (2013.01); *C04B 35/62281* (2013.01); *C04B 35/62295* (2013.01); *C04B 35/62844* (2013.01); *C04B 35/62871* (2013.01); *C04B 35/62894* (2013.01); *C04B 35/76* (2013.01); *C04B 35/80* (2013.01); *C04B 2235/524* (2013.01); *C04B 2235/5244* (2013.01); *C04B 2235/5264* (2013.01); *C04B 2235/5284* (2013.01); *C04B 2235/5288* (2013.01); *C04B 2235/6581* (2013.01)

(58) Field of Classification Search
None
See application file for complete search history.

(56) References Cited

U.S. PATENT DOCUMENTS

| | | | | |
|---|---|---|---|---|
| 4,562,050 | A | * | 12/1985 | Koeda ................. C01B 21/064 423/290 |
| 5,292,692 | A | | 3/1994 | Maloney et al. |
| 5,418,194 | A | | 5/1995 | Dawes et al. |
| 6,121,169 | A | | 9/2000 | Carpenter et al. |

(Continued)

FOREIGN PATENT DOCUMENTS

| | | |
|---|---|---|
| EP | 1679295 A1 | 7/2006 |
| WO | 2015041871 | 3/2015 |

OTHER PUBLICATIONS

Pippel et al., "CVD-coated boron nitride on continuous silicon carbide fibres: structure and nanocomposition," 2000, Journal of the European Ceramic Society 20, pp. 1837-1844.*

(Continued)

*Primary Examiner* — Robert Vetere
(74) *Attorney, Agent, or Firm* — Carlson, Gaskey & Olds, PC

(57) ABSTRACT

A method of preparing a fiber for use in forming a ceramic matrix composite material comprises the steps of removing an organic sizing from a fiber to provide pyrolyzed remnants on the fiber, and using the pyrolyzed remnants as a reactant to provide an interface coating on the fiber.

19 Claims, 1 Drawing Sheet

(56) References Cited

U.S. PATENT DOCUMENTS

| | | |
|---|---|---|
| 7,056,849 B2 | 6/2006 | Wan et al. |
| 7,544,394 B2 | 6/2009 | Boutwell et al. |
| 8,313,598 B2 | 11/2012 | Butler |
| 8,545,938 B2 | 10/2013 | Schmidt et al. |
| 8,986,845 B2 | 3/2015 | Kmetz et al. |
| 2006/0147692 A1* | 7/2006 | Kmetz .............. C04B 35/62868 428/292.1 |
| 2009/0060747 A1 | 3/2009 | Strock et al. |
| 2011/0071013 A1 | 3/2011 | Newton et al. |
| 2013/0084389 A1 | 4/2013 | Schmidt et al. |
| 2013/0224471 A1 | 8/2013 | Sheedy et al. |
| 2013/0287941 A1 | 10/2013 | Gray |

OTHER PUBLICATIONS

U.S. Appl. No. 14/595,294, filed Jan. 13, 2015.
Pippel, E. et al, "CVD-coated boron nitride on continuous silicon carbide fibres: structure and nanocomposition," Journal of the European Ceramic Society, Elsevier Science Publishers, Oct. 1, 2000, vol. 20, No. 11, pp. 1837-1844.

\* cited by examiner

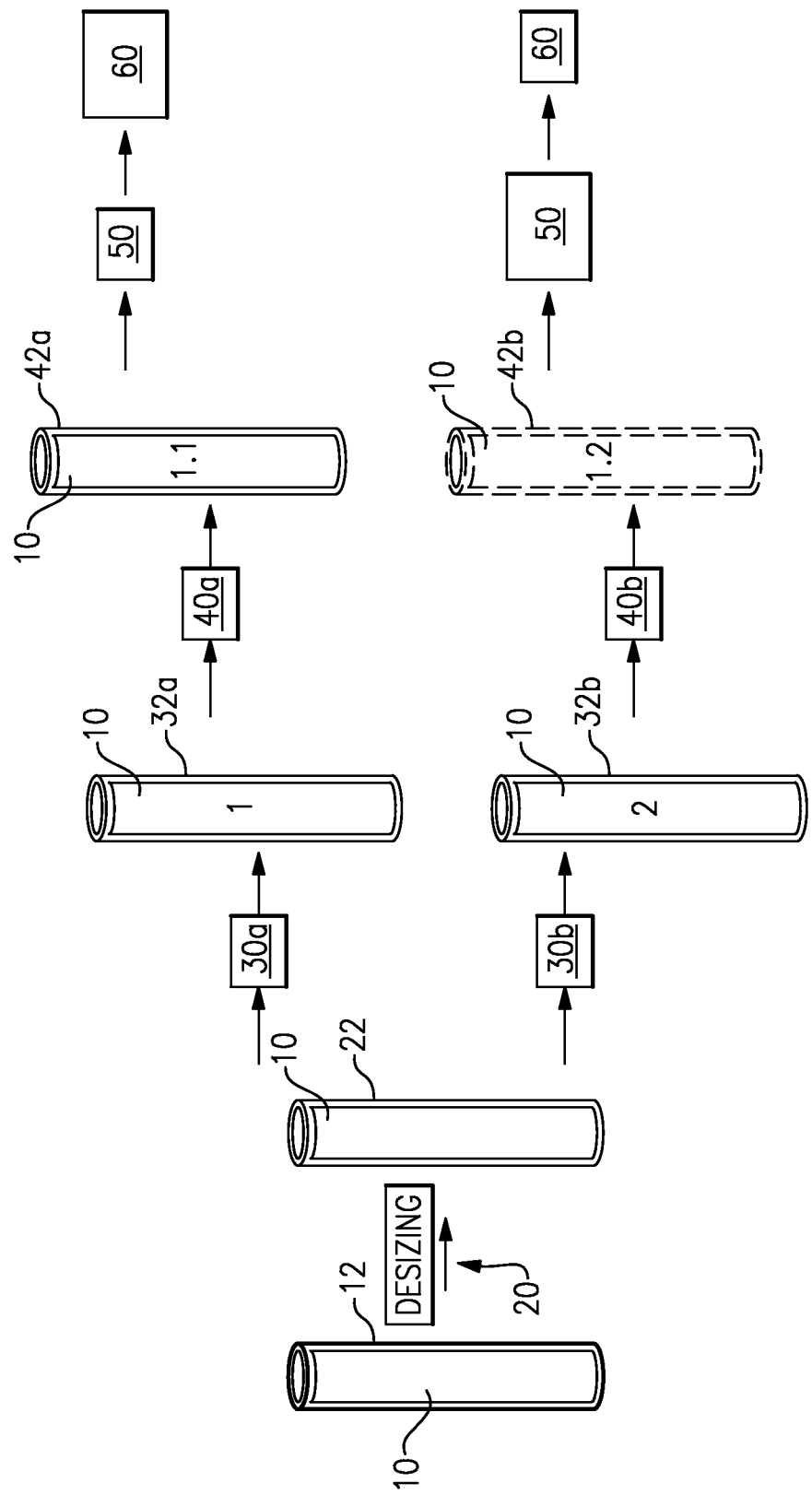

METHOD FOR COMBINED DESIZING AND INTERFACE COATING OF FIBERS FOR CERAMIC MATRIX COMPOSITES

CROSS-REFERENCE TO RELATED APPLICATION

This application claims priority to U.S. Provisional Patent Application No. 62/008,543, filed Jun. 6, 2014.

BACKGROUND OF THE INVENTION

This application relates to a method of desizing or removing an organic coating from ceramic or glass fibers and using remnants of the removal process as a reactant to provide an interface coating.

Ceramic and glass fibers are utilized in the formation of ceramic matrix composite ("CMC") materials. CMC materials are often utilized in high temperature applications. As an example, gas turbine engines may incorporate a number of components formed of CMC materials. CMC materials are typically formed from a process that includes the steps of: lay-up and fixation of ceramic fibers to form a preform; infiltration of a matrix material into the preform to form a CMC structure; final machining of the CMC structure; and any other further treatments, such as providing additional coatings for example.

The CMC materials are formed from high temperature ceramic or glass fibers, such as silicon carbide (SiC) fibers, siliconborocarbonitride (SiBCN) fibers, silicon nitride ($Si_3N_4$) fibers, boron carbide ($B_4C$) fibers, etc. The diameter of such fibers may range between 5 and 150 microns. These fibers are typically provided with a polymeric fiber coating, also called a sizing, which prevents fiber breakage and damage during handling after production.

Additionally, interface coatings (IFC) are needed on the ceramic fibers to provide a weak interface for debonding from the matrix, as well as offering environmental protection of the fiber. As an example, an interface coating for silicon based CMCs would be a boron nitride or pyrolytic carbon inner layer with an additional outer layer such as SiC or $Si_3N_4$, for example.

During the fabrication of CMCs, the sizing must be removed from the fibers, or desized, prior to application of the fiber interface coating(s). Typically, the fibers are heated to burn off the sizing, which can form residual carbon on the surface of the fibers. Traditionally, the desizing of fibers, such as SiC for example, has been provided by using a high temperature ammonia heat treatment. In some instances, other methods such as passing the fibers through a flame or other oxidizing atmosphere have also been used to burn off the polymer coating and desize the fiber. For textile sizes and applications, hot water treatments have also been utilized. It is important that the sizing be completely removed prior to application of the interface coating to ensure that the final CMC structure has the desired properties.

SUMMARY OF THE INVENTION

In a featured embodiment, a method of preparing a fiber for use in forming a ceramic matrix composite material comprises the steps of removing an organic sizing from a fiber to provide pyrolyzed remnants on the fiber, and using the pyrolyzed remnants as a reactant to provide an interface coating on the fiber.

In another embodiment according to the previous embodiment, the organic sizing comprises a polymer based coating.

In another embodiment according to any of the previous embodiments, the polymer based coating further comprises carbon nanotubes.

In another embodiment according to any of the previous embodiments, a layer is subsequently formed that includes boron nitride nanotubes.

In another embodiment according to any of the previous embodiments, the polymer based coating further comprises select inorganic additives or catalysts.

In another embodiment according to any of the previous embodiments, the pyrolyzed remnants include residual carbon.

In another embodiment according to any of the previous embodiments, a heat treatment with a material comprising a solid species includes at least boron to provide the interface coating.

In another embodiment according to any of the previous embodiments, the heat treatment occurs in a vacuum.

In another embodiment according to any of the previous embodiments, the heat treatment occurs approximately at 100 mTorr pressure or less.

In another embodiment according to any of the previous embodiments, the heat treatment occurs approximately at 1450° Celsius or less.

In another embodiment according to any of the previous embodiments, an additional heat treatment is provided in nitrogen to provide a boron carbide, a boron nitride coating, and/or a boron nitride coating that includes carbon.

In another embodiment according to any of the previous embodiments, the heat treatment occurs in nitrogen.

In another embodiment according to any of the previous embodiments, the heat treatment occurs approximately at 1450° Celsius or less.

In another embodiment according to any of the previous embodiments, an additional heat treatment is provided in nitrogen with silicon oxide to provide a boron nitride coating, a boron nitride coating that includes carbon, and/or silicon nitride coating.

In another featured embodiment, a method of forming a ceramic matrix composite material comprises the steps of removing an organic sizing from a fiber to provide pyrolyzed remnants on the fiber. The pyrolyzed remnants are used as a reactant to provide an interface coating on the fiber. A ceramic matrix composite is formed from fibers having the interface coating.

In another featured embodiment, a method of preparing a fiber for use in forming a ceramic matrix composite material comprises the steps of removing a polymer based sizing from a ceramic fiber to provide residual carbon on the fiber, and using the residual carbon as a reactant to provide an interface coating on the fiber.

In another embodiment according to the previous embodiment, a heat treatment is provided with a boron based solid species to provide the interface coating.

In another embodiment according to any of the previous embodiments, the heat treatment occurs in a vacuum approximately at 100 mTorr pressure or less, and at a temperature of approximately 1450° Celsius or less, to form the interface coating as a boron carbide coating.

In another embodiment according to any of the previous embodiments, the heat treatment occurs in nitrogen at a temperature of approximately 1450° Celsius or less to form the interface coating as a boron (carbon) nitrogen coating.

In another embodiment according to any of the previous embodiments, an additional heat treatment is provided in nitrogen with silicon oxide, and at a temperature of approximately 1450° Celsius or less, to provide a boron nitride coating, a boron nitride coating that includes carbon, and/or silicon nitride coating.

These and other features may be best understood from the following drawings and specification.

BRIEF DESCRIPTION OF THE DRAWINGS

FIG. 1 shows a method of forming a fiber with an interface coating to be used to form a CMC material.

DETAILED DESCRIPTION

FIG. 1 shows a method for preparing a fiber for use in forming a ceramic matrix composite (CMC) material. As discussed above, CMC materials are typically formed from a process that includes the steps of: lay-up and fixation of glass or ceramic fibers to form a preform; infiltration of a matrix material into the preform to form a CMC structure; and final processing of the CMC structure.

The CMC materials are formed from high temperature ceramic fibers, such as silicon carbide (SiC) fibers, silicon-borocarbonitride (SiBCN) fibers, silicon nitride ($Si_3N_4$) fibers, boron carbide ($B_4C$) fibers, etc. The diameter of such fibers may range between 5 and 150 microns. FIG. 1 shows an example of such a fiber 10 that is provided with a polymeric fiber coating or sizing 12, which prevents fiber breakage and damage during handling.

Before an interface coating, such as boron carbide for example, can be applied to the fiber 10, the sizing 12 must be removed. In one example, the sizing 12 comprises an organic sizing made from a polymer based material. To remove the sizing 12, a first step 20 is performed where the fiber 10 with the sizing 12 is subjected to a heat treatment in a vacuum or inert atmosphere (argon (Ar), nitrogen (N2), helium (He), etc.). This heat treatment occurs for a predetermined amount of time at a temperature of approximately 1000° C. (1832° F.) or less.

Once this step 20 is completed, the sizing 12 has been removed from the fiber 10. However, the heat treatment causes pyrolysis of the sizing 12 which results in a remnant material that is left on the outer surface of the fiber 10. This material comprises a layer 22 of residual carbon from the pyrolyzed organic sizing on the fiber 10. The pyrolyzed remnants serve as a reactant to provide an interface coating on the fiber. This will be explained in greater detail below.

Next, a heat treatment step 30a or 30b is provided for the fiber 10 with the layer 22 of residual carbon in order to form the interface coating. This heat treatment step is utilized with a material that comprises a solid species that includes at least boron. In one example, the boron-containing solid species is placed in a reactor vessel or furnace chamber. In one example, the boron-containing solid species comprises boron oxide ($B_2O_3$). This solid is heated such that it substantially or fully melts during the heat treatment step to supply a significant vapor pressure. This provides a gaseous reactant source for the residual carbon layer 22, which then produces a boron nitride, carbide, or a mixed nitride/carbide layer. In one example, this heat treatment step occurs simultaneously or concurrently with the desizing heat treatment step 20 within the same reactor vessel or furnace chamber during a single heat treatment cycle. Two different examples of heat treatment are discussed below.

In one example, a heat treatment step 30a occurs in a vacuum at approximately 100 mTorr pressure or less, and at a temperature of approximately 1450° Celsius (2642° F.) or less. The boron oxide ($B_2O_3$) melts as described above and provides a gaseous reactant that reacts with the residual carbon to produce a fiber 10 with an interface coating 32a that is comprised of boron carbide (e.g. $B_4C$). This boron carbide interface coating may be subjected to an additional heat treatment step 40a in nitrogen to convert the boron carbide layer in part, or fully, to a boron nitride layer 42a or a combination thereof. Thus, the layer resulting from the heat treatment step 40a could be a fully boron nitride layer, or could be a layer that comprises a carbon-containing BN. In one example, this additional heat treatment step 40a occurs for a predetermined amount of time at a temperature of approximately 1600° Celsius (2912° F.) or less.

In another example, a heat treatment step 30b is applied to the fiber 10 with the residual carbon layer 22. This alternative heat treatment step 30b occurs in nitrogen (1 atmosphere or partial pressure) at a temperature of approximately 1450° Celsius or less. The boron oxide ($B_2O_3$) melts as described above and provides a gaseous reactant that reacts with the residual carbon to produce a fiber 10 with an interface coating 32b that is comprised of a boron (carbon) nitrogen layer, which is fully boron nitride (BN) or substantially boron nitride (BN) with some carbon in solution. This boron (carbon) nitrogen interface coating 32b may be subjected to an additional heat treatment step 40b in nitrogen with silicon oxide (SiO) solid in the reaction chamber to convert the boron carbide layer in part, or fully, to a layer or layers 42b that include boron (carbon) nitrogen (fully or substantially boron nitride (BN) with some carbon in solution) and silicon nitride ($Si_3N_4$), or a combination thereof. In one example, this additional heat treatment step 40b occurs for a predetermined amount of time at a temperature of approximately 1600° Celsius or less.

Next, in either embodiment, once the interface coating has been provided, a ceramic matrix composite (CMC) material is formed from fibers having the interface coating, as indicated at 50. Finally, the CMC material is then used to form a component 60 for a gas turbine engine. The component 60 formed in these ways may be for use in a gas turbine engine, in one example, and could be a turbine blade, vane, blade outer air seal, combustor liner, etc.

Optionally, the sizing 12 that is originally provided on the fibers 10 could be selected to include selected organic and inorganic additives to enhance the formation or functionality of the subsequently formed layers, such as carbon nanotubes (which may convert to boron nitride nanotubes), or small amounts of catalysts for these reactions such as iron, nickel, etc. Using carbon nanotubes in the sizing can lead to formation of BN nanotubes. Using catalysts in the sizing can facilitate lower temperature growth of BN.

The subject invention provides in one heat treatment cycle the opportunity for both desizing of high temperature ceramic fibers and an in-situ formation of an interface coating of desired chemistry. As discussed above, the preferred reaction schemes are those which occur first under vacuum, which will facilitate vaporization of the gaseous reactant species and encourage a more uniform reaction (i.e. under the low pressure of the vacuum the gaseous species should be distributed throughout the reaction chamber vs. a flowing gas).

Additional benefits of the invention include an enhancement in surface roughness on the fiber, formation of uniform, conformal coatings, and formation of more highly crystalline coating phases, i.e. hexagonal BN vs. amorphous or turbostratic. The invention also avoids the use of hazardous materials (or byproducts), such as those found in typical chemical vapor deposition processes for interface coatings.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of preparing a fiber for use in forming a ceramic matrix composite material comprising the steps of:
   removing an organic sizing from a fiber to provide pyrolyzed remnants on the fiber, the pyrolyzed remnants including residual carbon;
   using the pyrolyzed remnants as a reactant to provide an interface coating on the fiber; and
   performing a heat treatment to create the interface coating, wherein the heat treatment occurs in a vacuum or in nitrogen.

2. The method according to claim 1 wherein the organic sizing comprises a polymer based coating.

3. The method according to claim 1 including providing the heat treatment with a material comprising a solid species that includes at least boron to provide the interface coating.

4. The method according to claim 3 wherein the heat treatment occurs in the vacuum.

5. The method according to claim 4 wherein the heat treatment occurs approximately at 100 mTorr pressure or less.

6. The method according to claim 4 wherein the heat treatment occurs approximately at 1450° Celsius or less.

7. The method according to claim 4 including providing an additional heat treatment in nitrogen to provide a boron carbide, a boron nitride coating, and/or a boron nitride coating that includes carbon.

8. A method of preparing a fiber for use in forming a ceramic matrix composite material comprising the steps of:
   removing an organic sizing from a fiber to provide pyrolyzed remnants on the fiber, wherein the organic sizing comprises a polymer based coating, and wherein the polymer based coating further comprises carbon nanotubes; and
   using the pyrolyzed remnants as a reactant to provide an interface coating on the fiber.

9. The method according to claim 8 including subsequently forming a layer that includes boron nitride nanotubes.

10. A method of preparing a fiber for use in forming a ceramic matrix composite material comprising the steps of:
    removing an organic sizing from a fiber to provide pyrolyzed remnants on the fiber, wherein the organic sizing comprises a polymer based coating, and wherein the polymer based coating further comprises select inorganic additives or catalysts; and
    using the pyrolyzed remnants as a reactant to provide an interface coating on the fiber.

11. A method of preparing a fiber for use in forming a ceramic matrix composite material comprising the steps of:
    removing an organic sizing from a fiber to provide pyrolyzed remnants on the fiber;
    using the pyrolyzed remnants as a reactant to provide an interface coating on the fiber;
    performing a heat treatment with a material comprising a solid species that includes at least boron to create the interface coating, and wherein the heat treatment occurs in nitrogen.

12. The method according to claim 11 wherein the heat treatment occurs approximately at 1450° Celsius or less.

13. The method according to claim 11 including providing an additional heat treatment in nitrogen with silicon oxide to provide a boron nitride coating, a boron nitride coating that includes carbon, and/or silicon nitride coating.

14. A method of forming a ceramic matrix composite material comprising the steps of:
    removing an organic sizing from a fiber to provide pyrolyzed remnants on the fiber, wherein the pyrolyzed remnants include residual carbon;
    using the pyrolyzed remnants as a reactant to provide an interface coating on the fiber;
    performing a heat treatment with a boron based solid species to create the interface coating, wherein the heat treatment occurs in a vacuum or in nitrogen; and
    forming a ceramic matrix composite from fibers having the interface coating.

15. A method of preparing a fiber for use in forming a ceramic matrix composite material comprising the steps of:
    removing a polymer based sizing from a ceramic fiber to provide residual carbon on the fiber;
    using the residual carbon as a reactant to provide an interface coating on the fiber; and
    performing a heat treatment to produce the interface coating, wherein the heat treatment occurs in a vacuum.

16. The method according to claim 15 including providing the heat treatment with a boron based solid species to provide the interface coating.

17. The method according to claim 16 wherein the heat treatment occurs in the vacuum approximately at 100 mTorr pressure or less, and at a temperature of approximately 1450° Celsius or less, to form the interface coating as a boron carbide coating.

18. A method of preparing a fiber for use in forming a ceramic matrix composite material comprising the steps of:
    removing a polymer based sizing from a ceramic fiber to provide residual carbon on the fiber;
    using the residual carbon as a reactant to provide an interface coating on the fiber; and
    performing a heat treatment with a boron based solid species to create the interface coating, wherein the heat treatment occurs in nitrogen at a temperature of approximately 1450° Celsius or less to form the interface coating as a boron (carbon) nitrogen coating.

19. The method according to claim 18 including providing an additional heat treatment in nitrogen with silicon oxide, and at a temperature of approximately 1600° Celsius or less, to provide a boron nitride coating, a boron nitride coating that includes carbon, and/or silicon nitride coating.

* * * * *